United States Patent
Kim (10) Patent No.: US 8,224,027 B2
(45) Date of Patent: Jul. 17, 2012

(54) METHOD AND APPARATUS FOR MANAGING VIDEO DATA

(75) Inventor: Kwang Baek Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1076 days.

(21) Appl. No.: 12/134,792

(22) Filed: Jun. 6, 2008

(65) Prior Publication Data

US 2009/0060271 A1    Mar. 5, 2009

(30) Foreign Application Priority Data

Aug. 29, 2007  (KR) .................. 10-2007-0086894

(51) Int. Cl.
*G06K 9/00*    (2006.01)
(52) U.S. Cl. .................. 382/103; 382/106; 382/107
(58) Field of Classification Search .................. 382/103, 382/106, 107, 154; 348/143, 153, 154, 155, 348/159
See application file for complete search history.

(56) References Cited

U.S. PATENT DOCUMENTS

| | | | |
|---|---|---|---|
| 7,035,434 B2* | 4/2006 | Estevez | 382/107 |
| 7,956,889 B2* | 6/2011 | Kelly et al. | 348/143 |
| 2004/0246336 A1* | 12/2004 | Kelly et al. | 348/143 |
| 2006/0018516 A1* | 1/2006 | Masoud et al. | 382/115 |
| 2009/0015671 A1* | 1/2009 | Addy | 348/143 |
| 2009/0254960 A1* | 10/2009 | Yarom et al. | 725/115 |

FOREIGN PATENT DOCUMENTS

| | | |
|---|---|---|
| KR | 10-2003-0033127 A | 5/2003 |
| KR | 10-2006-0100341 A | 9/2006 |

OTHER PUBLICATIONS

Zhuo et al "Automatic passenger counting based on multi-objects recognition using dynamic images" Proc. SPIE 6042, 60421O (May 2005).*

* cited by examiner

*Primary Examiner* — Daniel G. Mariam
*Assistant Examiner* — Nancy Bitar
(74) *Attorney, Agent, or Firm* — Birch, Stewart, Kolasch & Birch, LLP

(57) ABSTRACT

A method for managing video data including selecting a target object from a monitored area monitored by at least one image capturing device, extracting feature data of the selected target object, detecting motion of an object occurring in video data corresponding to the monitored area, comparing feature data the object causing the detected motion with the extracted feature data of the target object, and outputting information related to the object causing the motion when the comparing step determines the object causing the motion is the target object.

22 Claims, 7 Drawing Sheets

Rec_tm+k(=2:35:20 P.M.)

CH2(Room 2)

METHOD AND APPARATUS FOR MANAGING VIDEO DATA

This non-provisional application claims priority under 35 U.S.C. §119(a) to Korean Patent Application No. 10-2007-0086894 filed in the Republic of Korea on Aug. 29, 2007, the entire contents of which is hereby incorporated by reference.

BACKGROUND OF THE INVENTION

1. Field of the Invention

The present invention relates to a method and apparatus for simply and conveniently tracking a target object appearing in a monitored video.

2. Description of the Related Art

Figure 1:
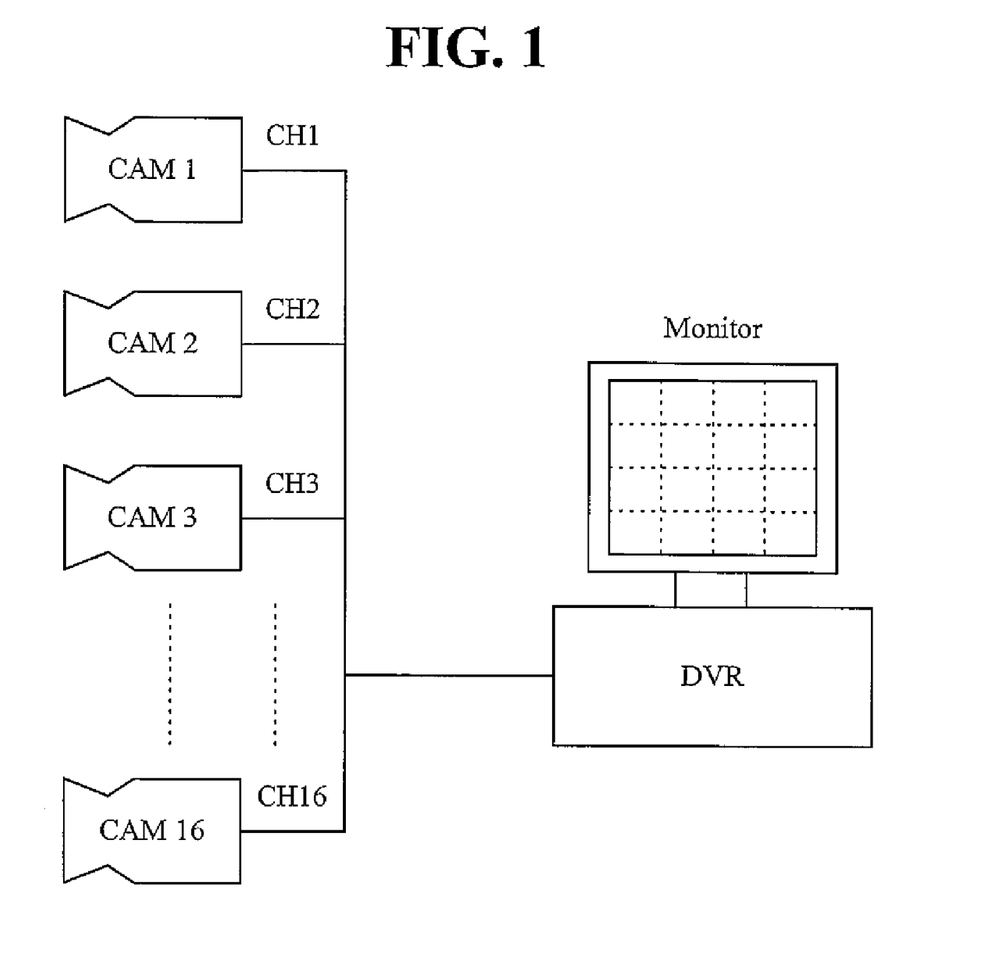
FIG. 1 is a block diagram of a surveillance system including a plurality of cameras connected to a DVR.

Many businesses and homes now use surveillance cameras to monitor and capture images occurring in particular locations that the user wants to protect or secure. For example, FIG. 1 illustrates a surveillance system including sixteen surveillance cameras CAM 1 to CAM 16 that capture images of subjects at corresponding areas, and transmit the captured images to a Digital Video Recorder (DVR) located at a remote place.

The DVR then displays the images captured by the surveillance cameras on a monitor, and also records the captured images in a storage medium, such as a hard disk or an optical disk. Further, unique channel numbers CH 1 to CH 16 are allocated to the sixteen cameras of FIG. 1, respectively, and managed. The DVR then displays each channel on a different portion of a display or on different displays so the user can monitor the different locations.

Further, a user can view previously recorded images using the DVR. That is, the DVR reads compressed video data recorded in the storage medium in response to the user's request, restores the compressed data, and displays the monitored video on the monitor screen. The user can also search for particular time and channel information using an input device, and the DVR searches and plays only data corresponding to the input time and channel information among video data recorded in the storage medium.

However, the user often wants more detailed information about a particular object or person in the video, and therefore must manually view much of the stored video to determine this information. This process is often time-consuming and cumbersome.

SUMMARY OF THE INVENTION

Accordingly, one object of the present invention is to address the above-noted and other problems.

Another object of the present invention is to provide a method and apparatus for extracting and summarizing information on a specific object appearing in a monitored video.

Still another object of the present invention is to provide a method and apparatus for providing a moving path of a specific object appearing in monitored videos of several channels.

Yet another object of the present invention is to provide a method and apparatus that allows a user to designate particular sub-areas within a monitored area with names using text or icons and retrieve monitored images corresponding the named sub-areas.

To achieve these and other advantages and in accordance with the purpose of the present invention, as embodied and broadly described herein, the present invention provides in one aspect a method for managing video data including selecting a target object from a monitored area monitored by at least one image capturing device, extracting feature data of the selected target object, detecting motion of an object occurring in video data corresponding to the monitored area, comparing feature data the object causing the detected motion with the extracted feature data of the target object, and outputting information related to the object causing the motion when the comparing step determines the object causing the motion is the target object.

In another aspect, the present invention provides an apparatus for managing video data. The apparatus includes an input unit configured to select a target object from a monitored area monitored by at least one image capturing device, an extracting unit configured to extract feature data of the selected target object, a detecting unit configured to detect motion of an object occurring in video data corresponding to the monitored area, a comparing unit configured to compare feature data the object causing the detected motion with the extracted feature data of the target object, and an outputting unit configured to output information related to the object causing the motion when the comparing unit determines the object causing the motion is the target object.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 2A:
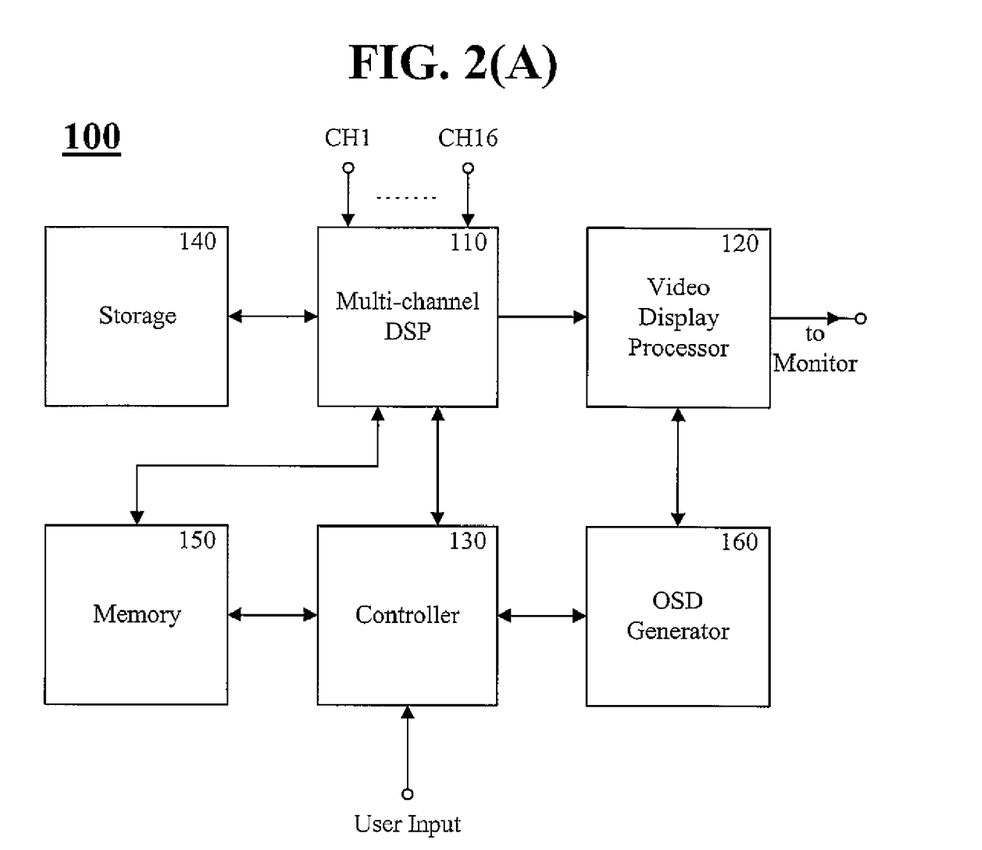
FIG. 2(A) is a block diagram of a DVR according to an embodiment of the present invention.

The present invention is applicable to various types of digital equipment used for photographing and recording a video such as the DVR illustrated in FIG. 2(A). As shown in FIG. 2A, the DVR 100 includes a multi channel DSP 110, a video display processor 120, a controller 130, a storage unit 140, a memory 150, and an On Screen Display (OSD) generator 160.

Figure 2B:
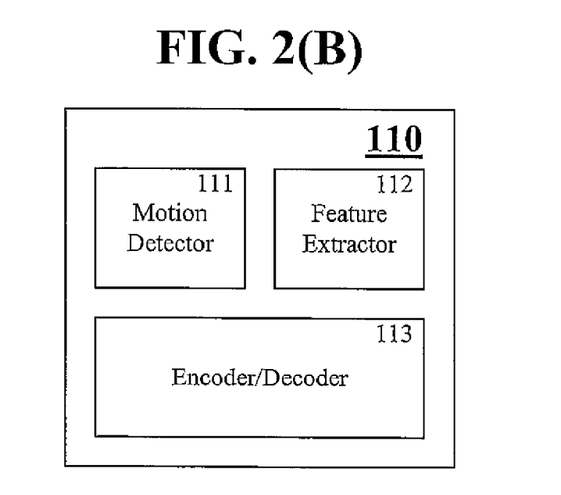
FIG. 2(B) is a block diagram of a Digital Signal Processor (DSP) included in the DVR shown in FIG. 1 according to an embodiment of the present invention.

FIG. 2(B) illustrates the DSP 110 in more detail. As shown in FIG. 2B, the DSP 110 includes a motion detector 111, a feature extractor 112 and an encoder/decoder 113. The motion detector 111, the feature extractor 112, and the encoder/decoder 113 can be realized using a software algorithm or a combination of software and hardware. Further, the functions of the DSP 110 and the controller 130 can be incorporated into a single unit.

The DSP 110 receives and converts camera video signals transmitted through the first to sixteenth channels (CH1 to CH 16) into digital video data, for example. The DSP 110 outputs the video data to the video display processor 120 that displays the video data of channels selected by an operator on a monitor screen according to a selected display mode.

In addition, the DSP 110 compresses the video data using a predetermined format such as the MPEG format, and records the video data by channels in the storage unit 140 such as a hard disk or an optical disk. Also, in response to a user's request, the controller 130 controls the DSP 110 to read and restore data recorded in the storage unit 140. The video display processor 120 then displays a selected video on the monitor screen.

Further, when a motion record mode is set, the DSP 110 detects an occurrence or non-occurrence of a motion in the monitor video of each channel transmitted from a corresponding camera via the motion detector 111. When motion is detected, the DSP 110 encodes the monitored video of the corresponding channel through the encoder/decoder 113 and records the encoded video in the storage unit 140.

Also, if the user selects an object track mode according to an embodiment of the present invention, the controller 130 controls the DSP 110 and the OSD generator 160 such that the user can set a square or circular selection region in a desired position and size within the monitor video screen using an input device such as a mouse. Therefore, the user can also select a target object that the user wants to track within the monitored video.

Further, when the target object is selected by the user, the controller 130 extracts feature data of the selected object, for example, a shape, a size, a texture, a color, an edge, a motion, etc. through the feature extractor 112 within the DSP 110 and stores the extracted feature data in the memory 150. An object Identifier (ID) for identifying the target object is also recorded in association with the feature data.

In addition, rather than the user selecting a target object to be tracked through an area selection block displayed on a screen, the DSP 110 can automatically detect an object whose motion is made within the monitored video for a predetermined time, extract feature data from the object, and generate feature data on the object causing the motion using XML-format text data.

The generated text data can then be displayed on a screen. Then, if the user selects the target object from an object list included in the text displayed on the screen, the controller 130 can also store feature data on the selected target object in the memory 150. Thus, in this instance, the target objects are displayed to the user, and then the user selects any one of the displayed target objects.

Further, when motion is detected within the monitored video through the motion detector 111 in the object track mode, the DSP 110 controls the encoder/decoder 113 to encode and store the monitored video of a channel where the motion is detected in the storage unit 140 and controls the feature extractor 112 to extract feature data of the object related with the detected motion.

In addition, when the feature data for the motion-detected object is consistent with the feature data for the target object stored in the memory 150, the controller 130 generates channel and time information in a text format, and displays the information on a monitor or stores the information in the memory 150.

When the object whose motion is detected is not consistent with the target object, the controller 130 controls the DSP 110 not to record the monitored video where the motion is detected. Further, when an object consistent with the target object with respect to their feature data appears in the monitored video, the controller 130 displays or stores text data reporting this to the user.

In addition, if a user requests motion of the target object be reported, the controller 130 arranges motions of the target object on a per time basis or channel basis based on text information stored in the memory 150, and displays the arranged motions on a screen through the OSD generator 160. The controller 130 also links each item to related video data such that a user can easily check a monitored video where the target object appears.

Alternately, when a moving path of a target object from a previously recorded monitoring video is intended to be tracked, the controller 130 extracts feature data on the target object through the feature extractor 112 and stores the extracted feature data in the memory 150 when the user designates a target object through an area selection block within a screen of a monitored video. The controller 130 also controls the DSP 110 to search video data of each channel recorded in the storage unit 140 for a monitored video including an object consistent or similar with the target object with respect to their feature data, generates channel and record time information on the searched monitoring video in a text format, and displays the generated channel and record time information through a monitor.

In addition, when detecting a motion within a video, extracting feature data on an object related to the motion, and storing the feature data in a text format in the storage unit 140 together when video data is recorded, the controller 130 can simply and conveniently identify and summarize motions of an object consistent with a target object among text data stored in the storage unit 140 without searching all of the video data recorded in the storage unit 140.

Figure 3:
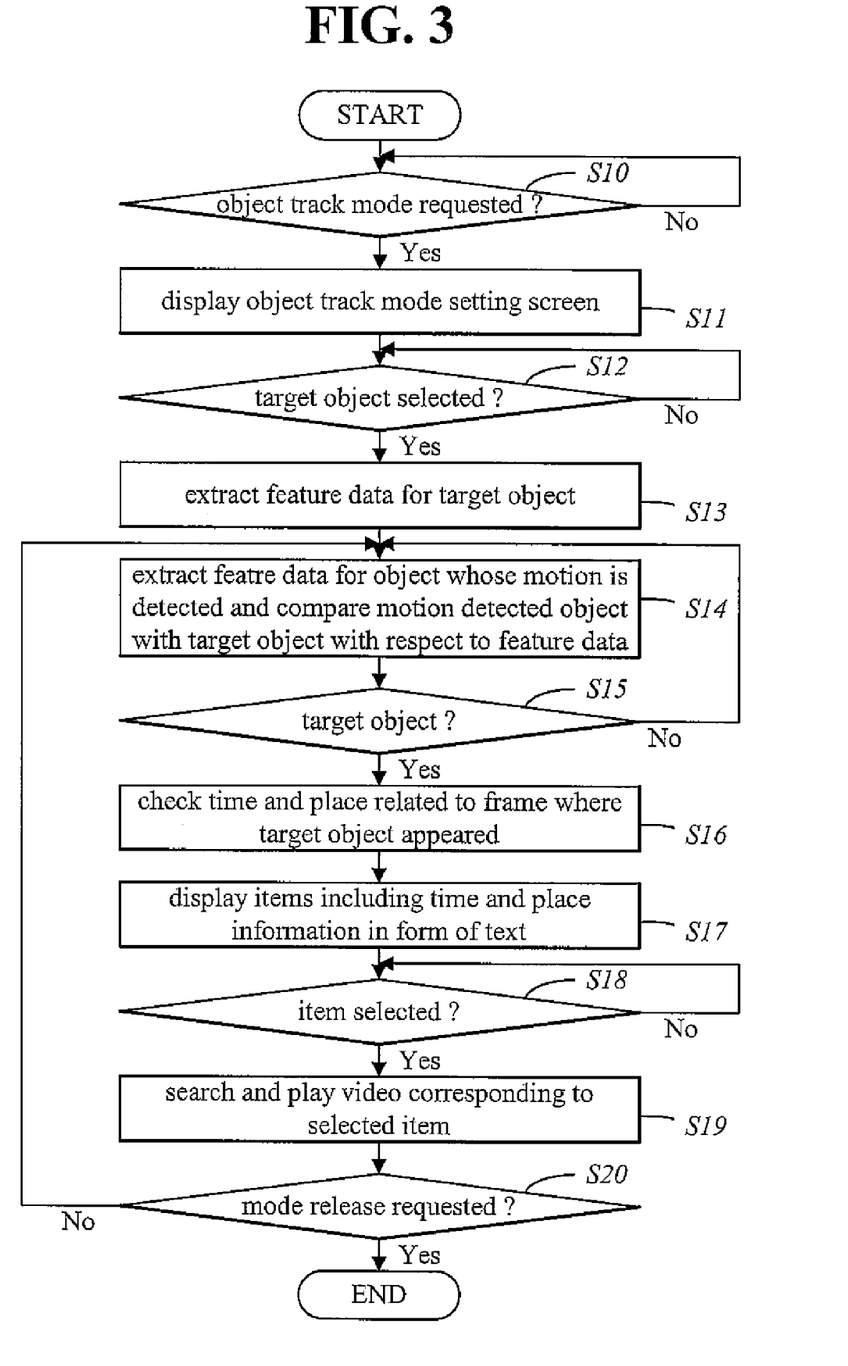
FIG. 3 is a flowchart illustrating a method for managing video data according to an embodiment of the present invention.

Next, FIG. 3 is a flowchart illustrating a method for managing video data according to an embodiment of the present invention. FIGS. 2(A) and 2(B) will also be referred to in this description.

Figure 4A:
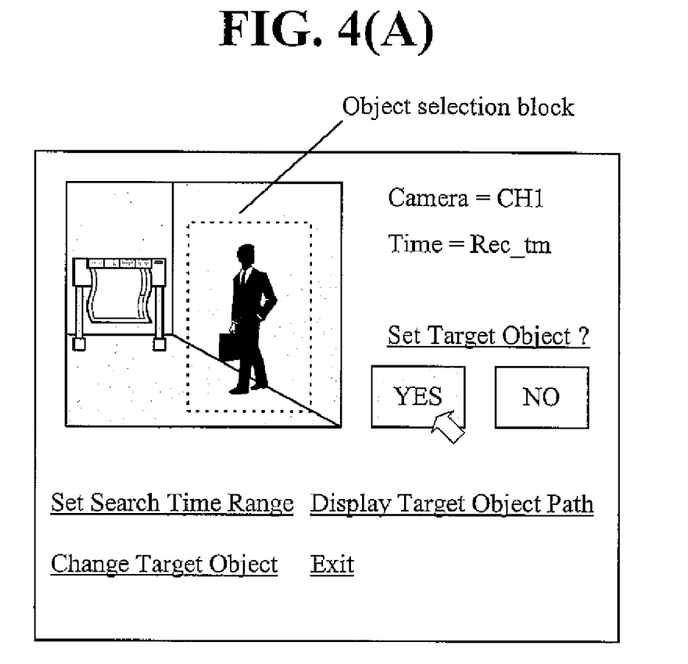
FIG. 4(A) is an overview illustrating an object track mode setting screen according to an embodiment of the present invention.

As shown in FIG. 3, when the user requests the object track mode (Yes in S10), the controller 130 controls the OSD generator 160 to display an object track mode setting screen on a monitor so the user can select an object whose move path is to be tracked (S11). As shown in FIG. 4(A), for example, the object track mode setting screen displays a monitored video frame, a channel number (e.g., CH 1) of a corresponding camera, and record time information (e.g., Rec_tm) and also displays various menu items.

As shown in FIG. 4(A), the area selection block is displayed together with the video frame contained in the setting screen such that the user can set the selection area in a desired position and size within the monitored video screen through an input device such as a mouse. Also, the menu item includes, for example, "Set Target Object", "Set Search Time Range", "Change Target Object", "Display Target Object Move Path", "Exit", etc. For example, the user can set one hour as a search time in the menu "Set Search Time Range" for searching for the target object for one hour.

Then, as shown in FIG. 3, when the user sets a selection area and selects a specific object as a target object within a monitored video (Yes in S12), the controller 130 controls the feature extractor 112 to extract feature information on a shape, a size, a texture, a color, an edge, a motion, etc. of the target object within the selection area and stores the feature information in the memory 150 (S13). In addition, the feature extractor 112 stores the feature information on the target object based on an object identifier.

Figure 4B:
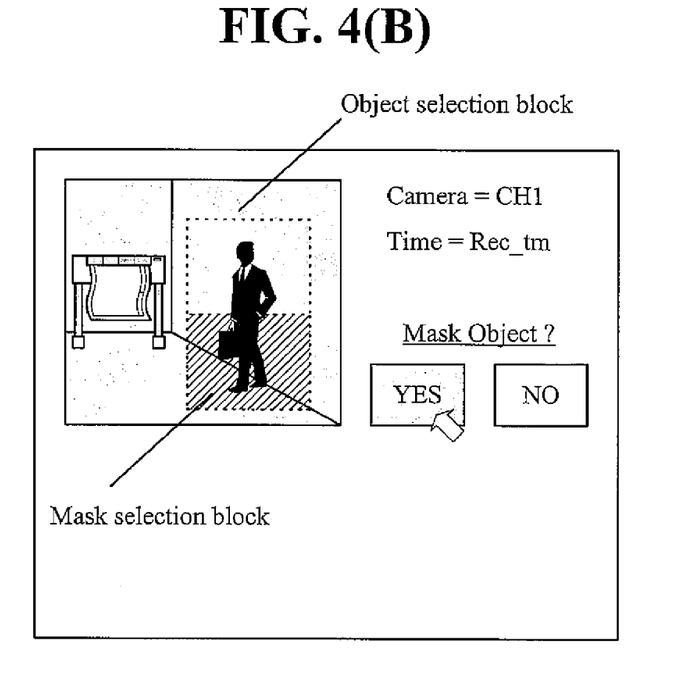
FIG. 4(B) is an overview illustrating another object track mode setting screen according to an embodiment of the present invention.
Figure 5:
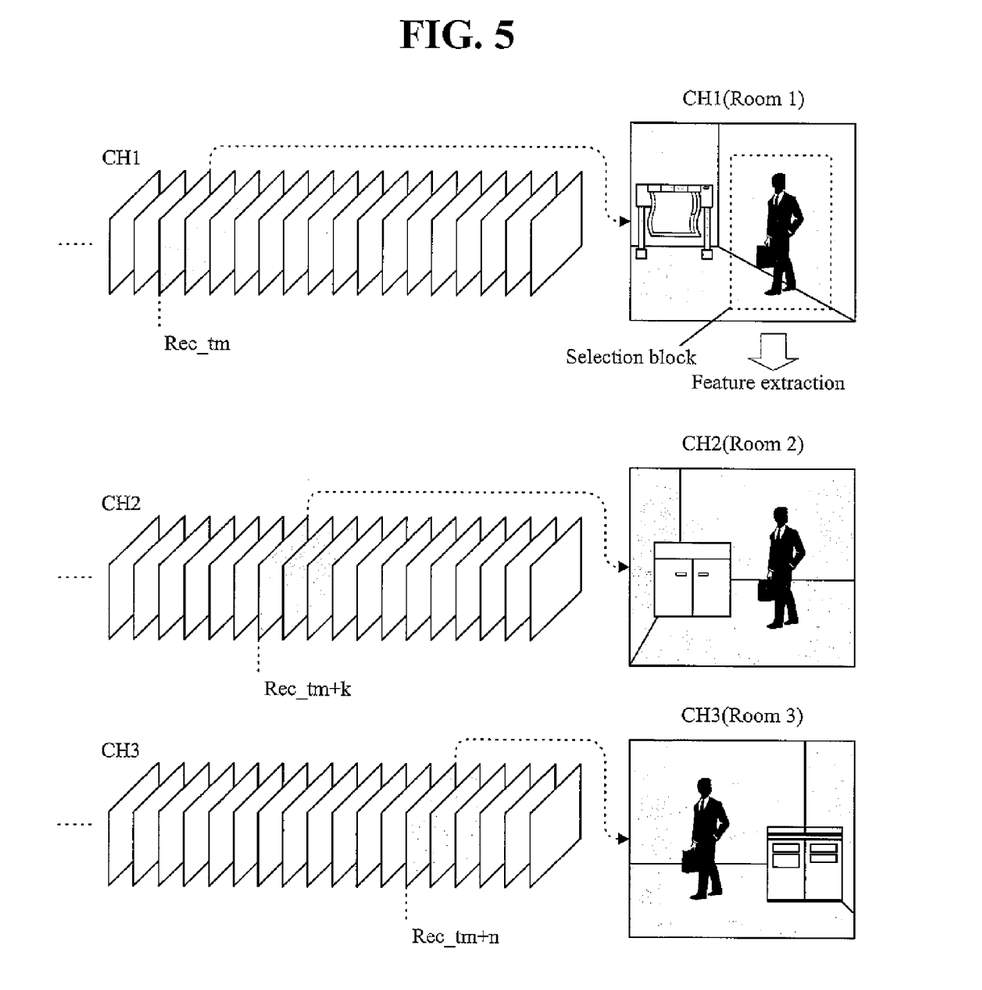
FIG. 5 is an overview illustrating setting a target object and searching a video of each channel for a video frame where the target object appears according to an embodiment of the present invention.

In addition, FIG. 5 is an overview illustrating setting a target object and searching video frames where the target object appears from videos of each channel according to an embodiment of the present invention. As shown in FIG. 5, and as described in the flowchart of FIG. 4, the motion detector 111 and the feature extractor 112 check for the occurrence or non-occurrence of a motion within a monitored video of each channel, extract feature data from an object whose motion is detected, and compare the extracted feature data with feature data on the target object stored in the memory 150 (S14).

In addition, the controller 130 checks whether there are consistent or similar elements among a plurality of feature elements such as a shape, a size, a texture, a color, an edge, a motion, etc. or whether a consistent degree of a specific element is high and determines whether the object whose motion is detected is the target object.

Further, when the object whose motion is detected is determined to be the target object (e.g., the object appears in a set of consecutive frames) (Yes in S15), the controller 130 checks a record time and channel information recorded in association with a corresponding monitored video (S16). The channel information such as a proper channel number allocated to each camera corresponds to a place where a camera is installed.

The controller 130 also converts the channel information into information about a place where a corresponding camera is installed, for example, information on a photographed place such as a room number 1 for the first channel and a room number 2 for the second channel. The information by channels can also be arbitrarily input by a user or can be previously set as a specific value.

Further, the controller 130 controls the OSD generator 160 to convert the record time and channel information into text, and displays the converted text information on a screen. The OSD generator 160 also generates each item based on the photographed place and displays the generated item together with a record time (S17). Alternately, the OSD generator 160 can generate each item based on a record time and display the generated item together with a photographed place.

For example, as shown in FIG. 5, items with a simple sentence representing a target object name (e.g., James) set by a user and a moving path of the target object are listed based on the photographed places on the screen. In addition, each item includes link information (e.g., channel information, record time information, etc.) for linking to a monitored video. Accordingly, when a user selects an arbitrary item on the screen (Yes in S18), the controller 130 searches and plays the monitored video corresponding to the selected item based on the link information (S19).

Figure 6:
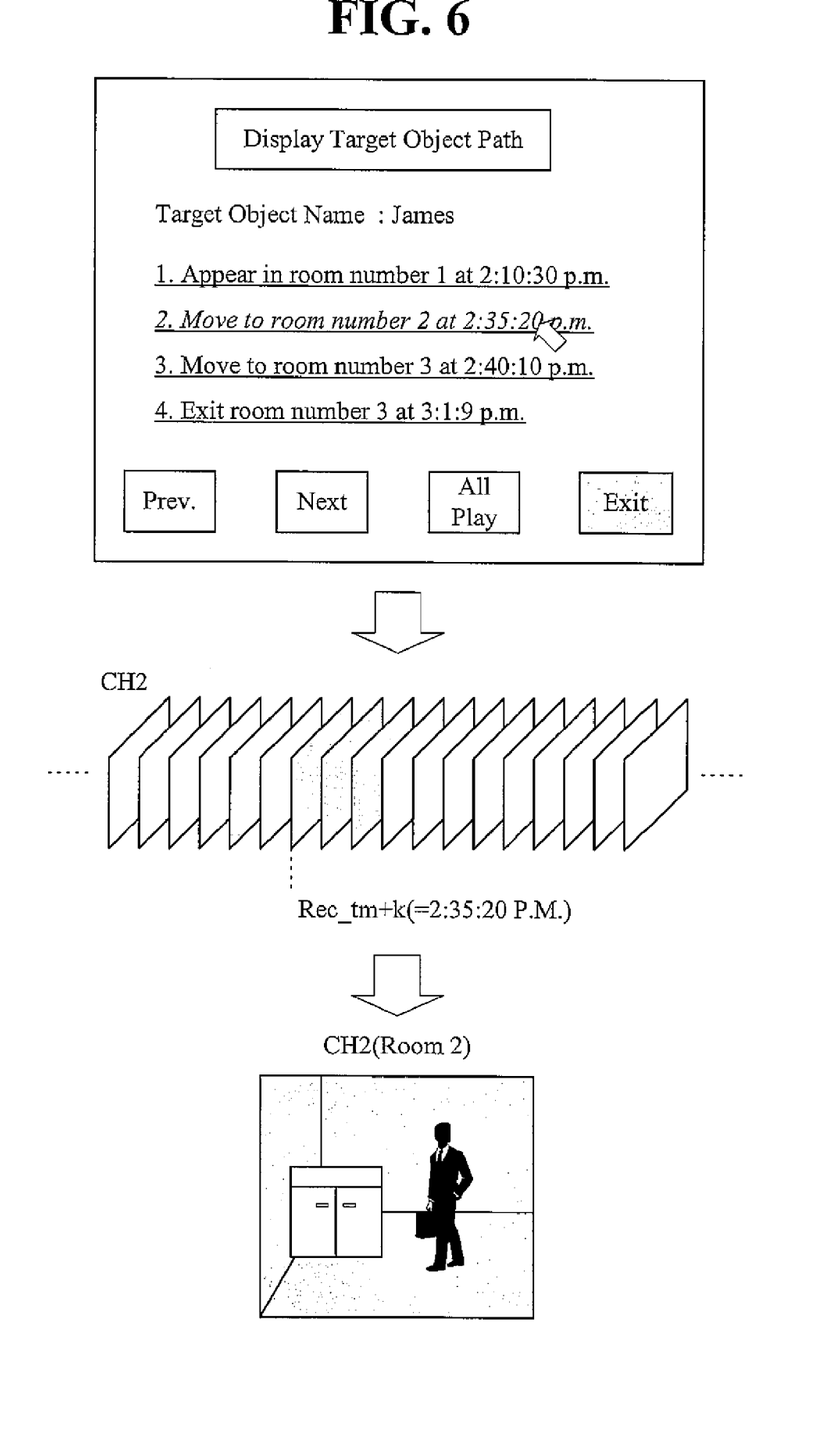
FIG. 6 is an overview illustrating a text screen including selectable items a target object's path according to an embodiment of the present invention.

For example, as shown in FIG. 6, if a user selects "2. Move to room number 2 at 2:35:20 p.m." as a sentence expressing a time and a place, the controller 130 searches the monitored videos of a second channel corresponding to the room number 2 for a video recorded at 2:35:20 p.m. When a user selects all items, the controller 130 can also sequentially search and play a monitored video corresponding to each item based on the link information. In addition, when the user releases or stops the object track mode (Yes in S20), the controller 130 releases or stops this mode and enters a default or standby mode.

Accordingly, a user can identify a move path of a target object that he/she desires, using a text sentence by items based on a place or time. Also, the user can select an arbitrary item and simply and conveniently identify a monitoring video of the target object photographed at a desired time and place.

In addition, in an alternative embodiment, the user can also advantageously mask portions of the target object that are not to be recorded. For example, FIG. 4(B) illustrates an example of a mask setting screen. In more detail, after the user has selected a particular target object or item in FIG. 4(A), the user is prompted with the screen shown in FIG. 4(B) so the user can then mask a portion of the target object that is not to be recorded.

As shown in FIG. 4(B), the user has masked the lower portion of the target object using the input device. Thus, in this instance, the DVR only records the motion of the target object that corresponds with the upper portion of the target object. Thus, the user can advantageously mask particular objects or items that he or she wants to be masked. Further, the screen in FIG. 4(B) can also be displayed independently of the screen in FIG. 4(A). That is, the user can select particular items or objects in an image area that are to be masked and not recorded (and then all other areas are recorded). This is particularly advantageous in a room that has furniture or other stationary items that the user does not want recorded.

Figure 7:
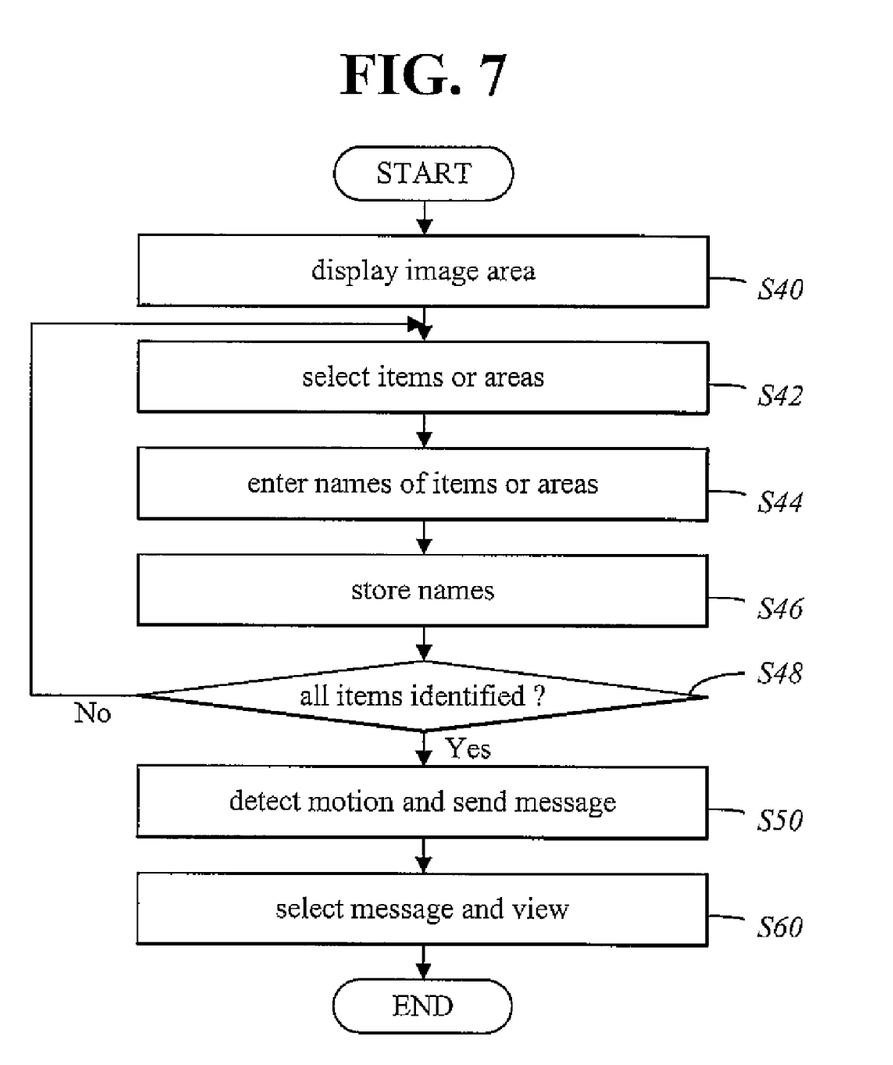
FIG. 7 is a flowchart illustrating a method for managing video data according to another embodiment of the present invention.

In addition, FIG. 7 is a flowchart illustrating a method for managing video data according to another embodiment of the present invention. As shown in FIG. 7, the method first displays an image area that is being monitored (S40). The image area may be an area captured by a single camera or multiple areas captured by multiple cameras. The user then selects items, objects or sub-areas within the displayed area(s) (S42).

For example, the user can select a sofa, lamp, table and door as objects in room. The user then enters names for each selected object or area (S44). The controller 130 then stores the names of the objects or area using XML, for example, along with the dimensions of the objects. Therefore, particular items, objects or areas in an image area can be selectively identified and named by a user.

The method then determines if the user has selected all objects he or she wants to identify (S48). When the user has completed selecting all objects (Yes in S48), the method monitors the image area to determine if motion has occurred in any of the identified objects. When motion has been detected, the method transmits a message to the user that motion has occurred (S50). For example, the message may be a text message sent to the user's mobile telephone informing the user motion has occurred in a living room and bedroom, for example.

The user can then select the living room or bedroom identified by the XML text and view the captured images and the motion that occurred in these areas. Therefore, the user can monitor areas in his or her home, for example, and see what motion has occurred, and whether any additional action needs to be taken (i.e., whether the motion is caused by an intruder or family member, for example).

Further, the present invention is also applicable to a plurality of digital video recorders connected through a network such as the Internet. For example, one digital video recorder extracts feature information on a target object and transmits the feature information to other digital video recorders to allow other digital video recorders to search the target object and track a move path of the target object within a wider area.

As described above, a user can simply and conveniently identify a move path of a desired target object without playing and identifying a monitoring video one by one. Also, the user can accurately identify the move path of the desired target object.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for managing video data, the method comprising:
    detecting motion of an object occurring in video data of one or more channels corresponding to one or more image capturing devices;
    comparing feature data of the object causing the detected motion with feature data of a target object;
    if the comparing step determines the object causing the motion is the target object, identifying information related to the object causing the motion, the identified information including time information and channel or location information at which the motion of the object is detected; and
    when the object causing the motion is detected in the video data of two or more channels, displaying the identified information as different items based on the location information or the time information.

2. The method of claim 1, wherein the feature data comprises at least one of a shape, a size, a texture, a color, an edge, and a motion of the target object and the object causing the motion.

3. The method of claim 2, wherein the comparing step determines the object causing the motion is the target object when the feature data of the target object is consistent or similar by a predetermined threshold to the feature data of the object causing the motion.

4. The method of claim 1, wherein the displaying step further displays frame information about a frame or frames of the video data corresponding to the object causing the motion.

5. The method of claim 1, wherein the location information and the time information comprise selectable links that link to video data corresponding to the target object.

6. The method of claim 5, further comprising:
    playing the video data corresponding to a selected link.

7. The method of claim 6, wherein the playing step displays a corresponding video data in sequence for each link when all links are selected.

8. The method of claim 1, further comprising:
    selecting the target object from a monitored area monitored by the one or more image capturing devices using a user-operated input device; and
    extracting the feature data of the selected target object.

9. The method of claim 8, further comprising:
    masking a part of the target object; and
    not storing or erasing video data corresponding to the masked part of the target object when the feature data of the object causing the motion substantially matches the feature data of the target object.

10. The method of claim 8, further comprising:
    naming the selected target object,
    wherein the outputting step outputs the name of the target object when the comparing step determines the object causing the motion is the target object.

11. The method of claim 10, wherein the displaying step outputs the name of the target object to a mobile terminal as a link text message such that a user of the mobile terminal can select the link text message to view video of the target object captured by the one or more image capturing devices.

12. An apparatus for managing video data, the apparatus comprising:
    an extracting unit configured to extract feature data of an object;
    a detecting unit configured to detect motion of an object occurring in video data of one or more channels corresponding to one or more image capturing devices;
    a comparing unit configured to compare feature data of the object causing the detected motion with feature data of a target object;
    an identifying unit configured to identify information related to the object causing the motion if the comparing unit determines the object causing the motion is the target object, the identified information including time information and channel or location information at which the motion of the object is detected; and
    an outputting unit configured to output the identified information as different items based on the location information or the time information when the object causing the motion is detected in the video data of the channels.

13. The apparatus of claim 12, wherein the feature data comprises at least one of a shape, a size, a texture, a color, an edge, and a motion of the target object and the object causing the motion.

14. The apparatus of claim 13, wherein the comparing unit is further configured to determine the object causing the motion is the target object when the feature data of the target object is consistent or similar by a predetermined threshold to the feature data of the object causing the motion.

15. The apparatus of claim 12, wherein the outputting unit is further configured to display frame information about a frame or frames of the video data corresponding to the object causing the motion.

16. The apparatus of claim 12, wherein the location information and the time information comprise selectable links that link to video data corresponding to the target object.

17. The apparatus of claim 16, wherein the outputting unit is further configured to display the video data corresponding to a selected link.

18. The apparatus of claim 17, wherein the outputting unit is further configured to display a corresponding video data in sequence for each link when all links are selected.

19. The apparatus of claim 12, further comprising:
    a user-operated input device configured to select the target object from a monitored area monitored by the one or more image capturing devices.

20. The apparatus of claim 19, further comprising:
    a masking unit configured to mask a part of the target object; and
    a storing unit configured not to store or erase video data corresponding to the masked part of the target object when the feature data of the object causing the motion substantially matches the feature data of the target object.

21. The apparatus of claim 19, wherein the user-operated inputting unit is further configured to allow a user to name the selected target object, and wherein the outputting unit is further configured to output the name of the target object when the comparing unit determines the object causing the motion is the target object.

22. The apparatus of claim 21, wherein the outputting unit outputs the name of the target object to a mobile terminal as a link text message such that a user of the mobile terminal can select the link text message to view video of the target object captured by the one or more image capturing devices.

* * * * *